G. H. DAVIS.
MACHINE FOR FORMING SHOE LACES.
APPLICATION FILED OCT. 16, 1909.

989,838.

Patented Apr. 18, 1911.
6 SHEETS—SHEET 4.

G. H. DAVIS.
MACHINE FOR FORMING SHOE LACES.
APPLICATION FILED OCT. 16, 1909.

989,838.

Patented Apr. 18, 1911.

UNITED STATES PATENT OFFICE.

GEORGE H. DAVIS, OF BROOKLYN, NEW YORK.

MACHINE FOR FORMING SHOE-LACES.

989,838.

Specification of Letters Patent.

Patented Apr. 18, 1911.

Application filed October 16, 1909. Serial No. 523,069.

*To all whom it may concern:*

Be it known that I, GEORGE H. DAVIS, a citizen of the United States, residing at Brooklyn, in the county of Kings and State of New York, have invented a new and useful Improvement in Machines for Forming Shoe-Laces, of which the following is a specification.

This invention relates to new and useful improvements in machines for forming shoe laces and it contemplates a machine for carrying out in a novel manner the operations of applying and cutting the tips, feeding the braid, and releasing and collecting into groups of determined number the completed laces, the object being a novel machine of comparative simplicity and one which performs its work in a highly efficient manner.

In the accompanying drawings, I have illustrated by way of example a preferred and advantageous embodiment of a machine constructed in accordance with the present invention.

In the said drawings.

Similar characters of reference designate corresponding parts throughout the several views.

Figure 1:
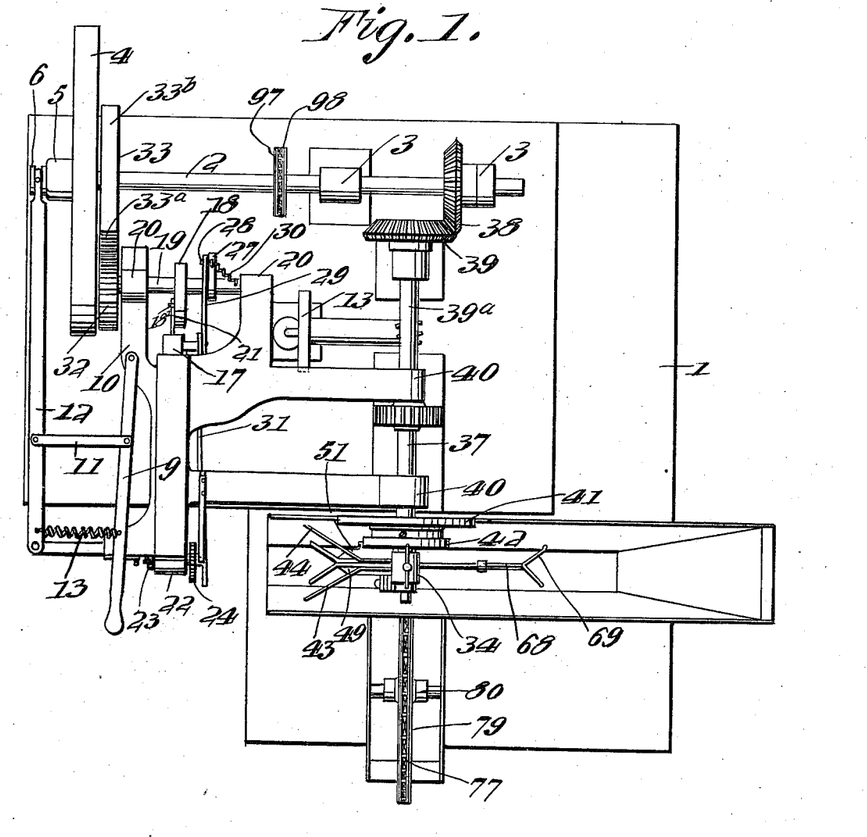
Figure 1 is a top plan view of such a machine.
Figure 2:
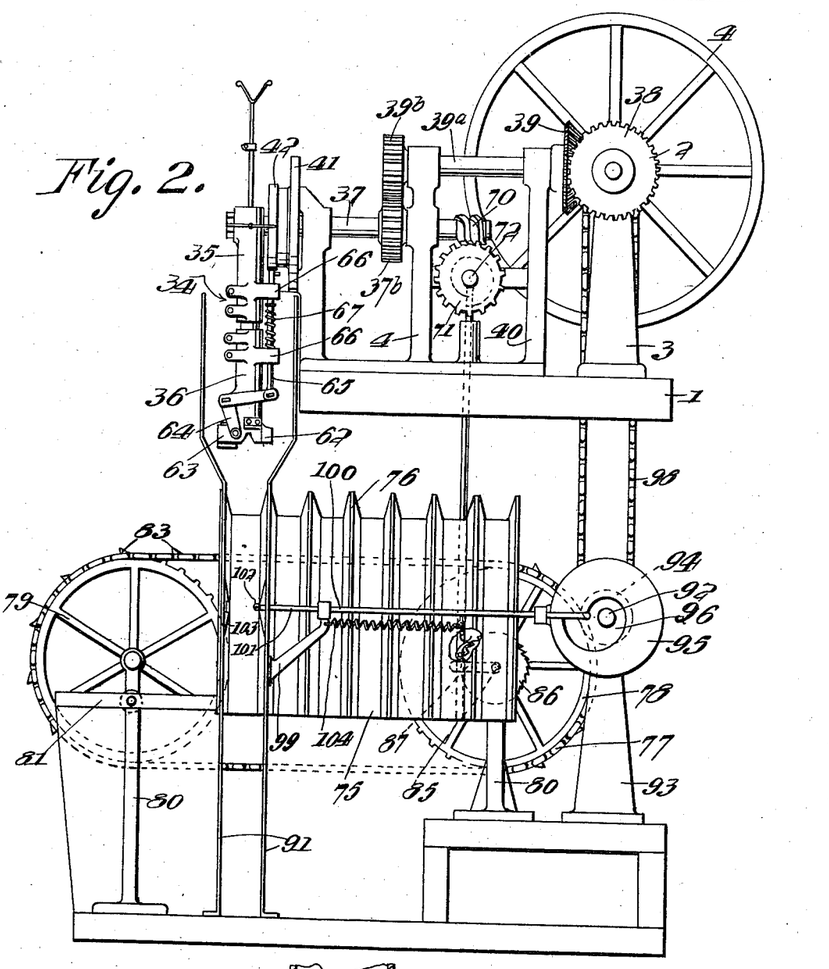
Fig. 2 is an end elevation thereof.
Figure 3:
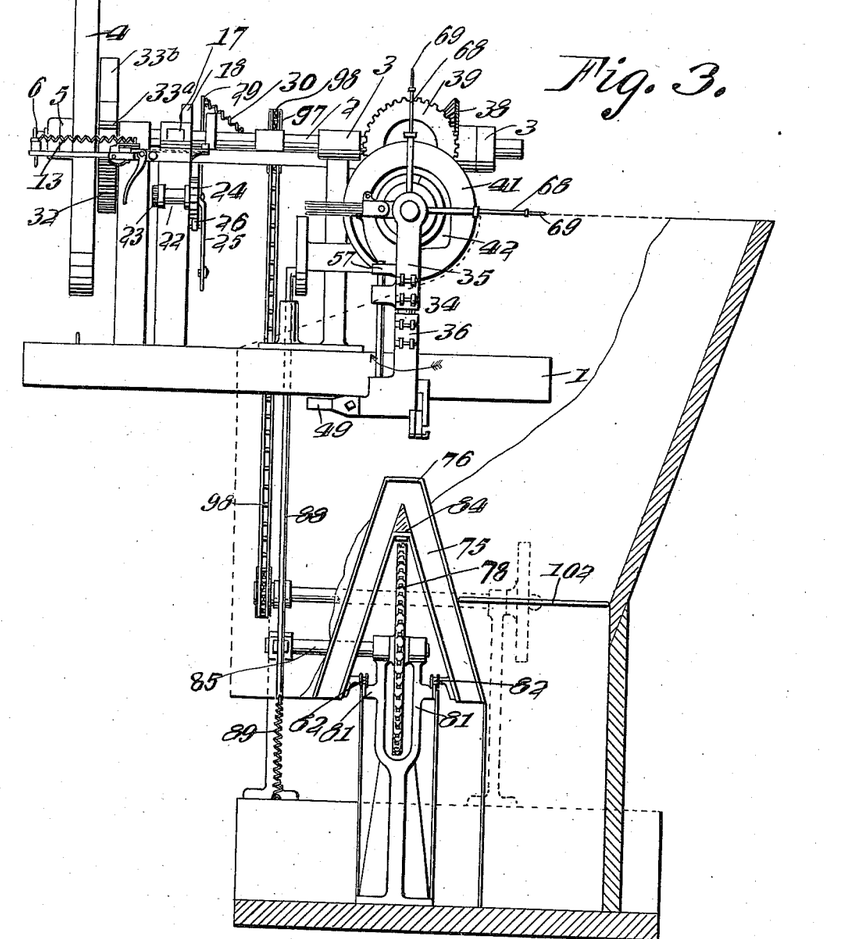
Fig. 3 is a side elevation thereof with parts shown in section.
Figures 8, 9, 10, 11, 12, 13:
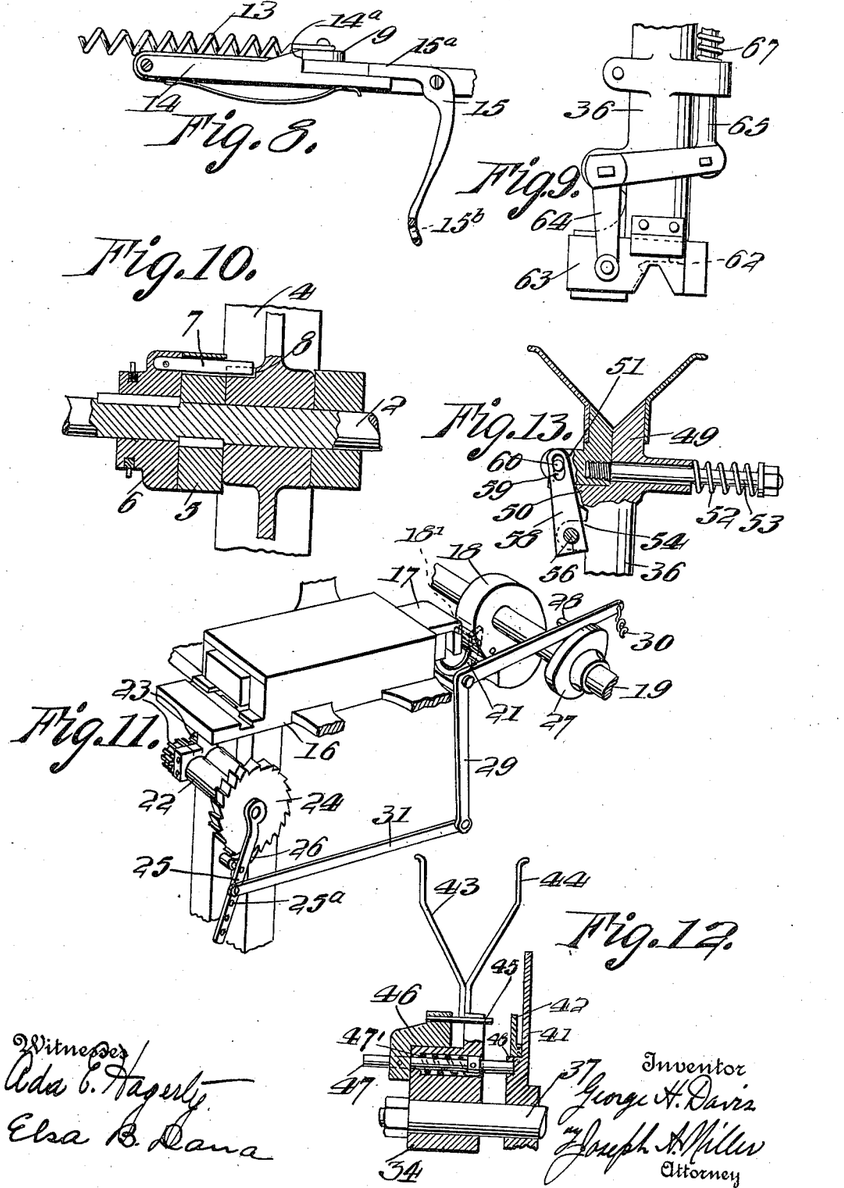
Fig. 8 is an enlarged side elevation of the starting lever locking mechanism.
Fig. 9 is a detail view of the lace cutting shears.
Fig. 10 is a detail sectional view of the starting and stopping clutch mechanism.
Fig. 11 is a detail view showing the tipping plunger and the tipping metal feed rollers and the operative connections of said plunger and feed rollers.
Fig. 12 is a detail sectional view of the gripping mechanism which takes up the slack of the braid.
Fig. 13 is a detail sectional view of the gripping mechanism which feeds the braid.

The various working parts are supported upon a bed plate 1 and are operated from a longitudinal shaft 2, which is journaled in bearings 3 and carries a driving pulley as 4. The latter is loose upon the shaft 2 and may be put into or out of operative relation therewith. For this purpose a clutch mechanism is employed which may advantageously consist of a collar, as 5, securely splined upon the shaft 2 and a collar, as 6, which is axially slidable on the shaft 2 and which has a pin, as 7, that projects through an opening in the collar, 5, and may be engaged or disengaged with respect to a notch 8, in the hub of the pulley 4.

For the purpose of effecting the engagement and disengagement of the clutch mechanism and the pulley 4, a starting lever as 9 may be employed. The lever 9 is pivoted for horizontal movement on a frame 10 and is connected by a link, as 11, to an arm as 12. The latter is pivoted at one end, and its other end is formed as a yoke for engagement in a groove in the collar 6. A movement of the lever 9 to the left, when the drawings only are considered, produces a corresponding movement of the arm 12 and the collar 6 and a disengagement of the pin 7 from the hub of the pulley 4. In like manner a movement of the lever 9 to the right produces a corresponding movement of the arm 12 and the collar 6 and an engagement of the pin 7 with the hub of the pulley 4. The action of the machine is thus stopped by the movement of the lever 9 to the left, and to accomplish this automatically a retractile coil spring as 13, is employed, one end of which is made fast and the other end of which is connected to the lever 9. For the purpose of locking the lever 9 in its operative position, that is to maintain the engaged relation of the clutch, the mechanism shown in Fig. 8 is preferably employed, such mechanism consisting of a pivoted spring hold catch, as 14, which has a shoulder, as 14ᵃ to hold the lever 9 against movement, and a pivoted trip arm as 15. The latter has an extension as 15$^a$ which overlies the free end of the catch 14 and it also has an eye as 15$^b$ through which the continuous strand of braid from which the laces are formed is drawn continuously with the operation of the machine. In case the braid should have a knot at any point along its length, such knot will ultimately engage the trip arm 15 and produce an operative movement thereof, resulting in the depression of the catch 14, and the releasing of the lever 9 which is now moved to the left by the spring 13 and which thereby disengages the clutch from the pulley 4. Thus the operation of the machine is automatically stopped under the circumstances indicated.

Figures 7, 16:
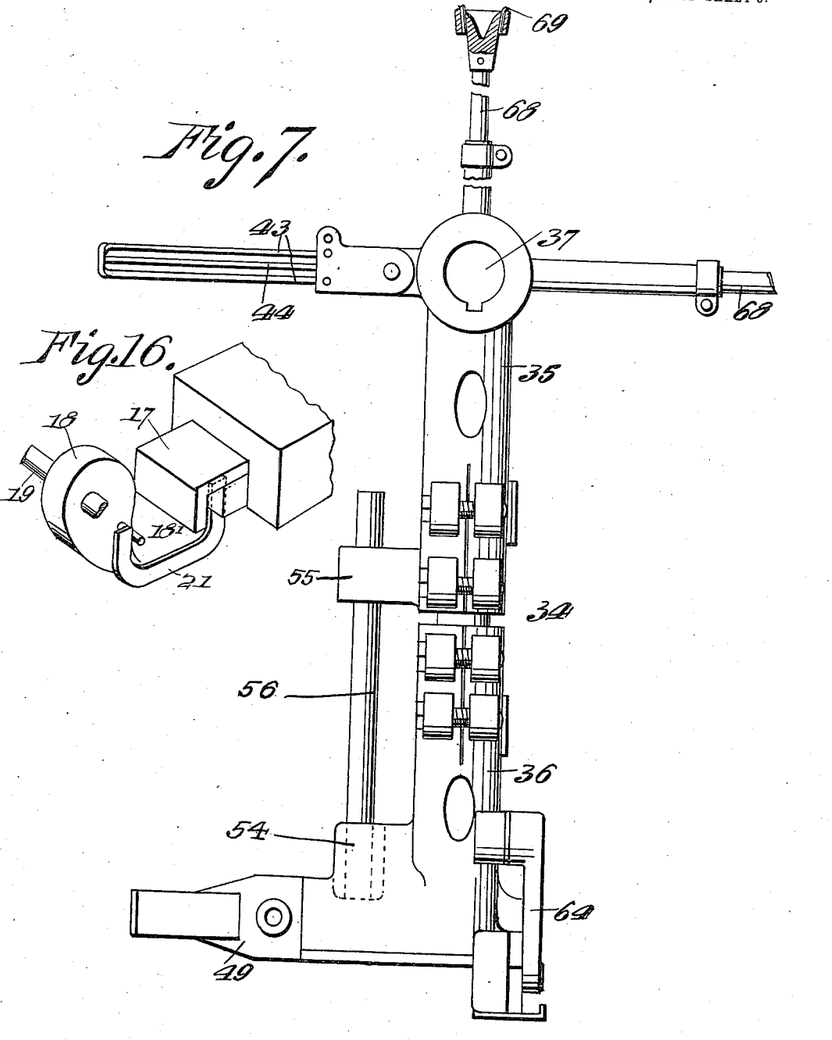
Fig. 7 is an enlarged side elevation of a rotary braid feeding arm which forms an element of the operating train.
Fig. 16 is a detail perspective view of the cam for operating the tip-applying plunger, and the parts directly associated therewith.
Figure 15:
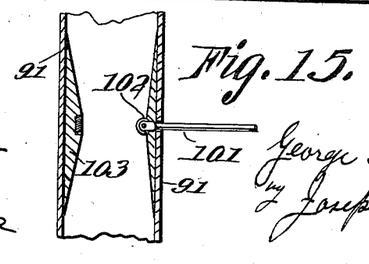
Fig. 15 is a detail view of a gripping rod and its coöperating clamping bed.

All the operative instrumentalities are in the present embodiment, driven from the shaft 2. The first instrumentality, the tip applying mechanism is, *per se* of known form and is shown only in sufficient detail to demonstrate its relation to the various other instrumentalities of the machine. The tipping mechanism includes a bed, as 16, with relation to which the tip applying plunger 17, has movement, and feeding mechanism for the tipping metal. The plunger 17 has a transverse reciprocatory movement which is produced by a cam, as 18, which is mounted on a longitudinal shaft 19, the latter being journaled in frame bearings 20. Cam 18 directly engages the rear end of plunger 17 to produce an operative thrust thereof, and said cam is provided at one side with a lateral pin 18', which during the revolution of the cam is adapted to engage the upbent terminal of a finger 21 secured to the said rear end of the plunger as shown in Fig. 15, thereby retracting the plunger. The tipping metal operating mechanism may advantageously consist of a pair of coöperative feeding rollers, as 22, having on their ends intergearing pinions, as 23. One of the rollers 22 is provided with a ratchet wheel as 24 which is rotated in a step-by-step manner through the intermediary of an oscillatory lever, as 25. The lever 25 carries a pawl 26 for engagement with the wheel 24, and its oscillative movements are produced by mechanism which may be advantageously of the following construction. The shaft 19 is provided with a disk, as 27, having a crank pin, as 28. At a suitable point on the frame, a bell crank lever, as 29, is pivoted. The lever 29 has an arm overlying the pin 28 and normally depressed by a suitably secured spring 30, and a depending arm that is connected by a link 31 to the lever 25, the connection preferably being of adjustable nature in order that the throw of the lever 25 may be increased or decreased as desired. For this purpose the lever 25 is provided at its lower end with a series of openings, as 25$^a$, in any desired one of which the connection of the link 31 may be fitted. The shaft 19 is driven from the shaft 2 only during a half of a revolution thereof and is idle during the period of the other half revolution. It is during this period throughout which the shaft 19 is idle that the other instrumentalities are in operation and it is during the period of activity of the shaft 19 that the other instrumentalities are in retraction or being reset. For the purpose of driving the shaft 19 in the manner stated, the same is provided with a spur wheel, as 32. The shaft 2, is also provided with a gear wheel, as 33 of twice the diameter of the wheel 32, and having half of its peripheral surface toothed as at 33$^a$ and the other half of its surface plain, as at 33$^b$.

The braid feeding, cutting and depositing mechanism will now be described. As shown, it may advantageously include as an essential element, what may for convenience be termed a revolving arm. This arm, designated in a general way, by the numeral 34, may conveniently be made in two adjustably connected sections, viz., an inner section as 35, and an outer section, as 36. The two sections of said arm have their body portions substantially tubular, and the confronting ends of said portions are split longitudinally as shown in Fig. 7. They are arranged in axial alinement and are connected by means of a rod or the like 34' which fits therein. By reason of the formation above described, it will be apparent that the outer section may be adjusted axially toward and from the inner section so as to correspondingly vary the length of the lace produced. To hold the sections in adjustable position pairs of clamping bolts 35' and 36' may be utilized, said bolts working in pairs of lugs 35$^2$ and 36$^2$ formed upon the corresponding sections. By tightening these bolts the split ends of the sections will be tightened upon the rod 34' as will be apparent.

The arm 34 is mounted fast upon a transverse shaft, as 37, which is fitted directly into the hub of the section 35 and which is provided at its inner end with a gear 37$^b$ meshing with a gear 39$^b$ secured to the outer end of a shaft 39$^a$, this shaft having secured to its inner end a bevel gear 39 meshing with and driven by a similar gear 38 secured to shaft 2. The shaft 37 is journaled in bearings 40 and is in turn the driving shaft of other instrumentalities of the machine.

Figures 4, 5, 6:
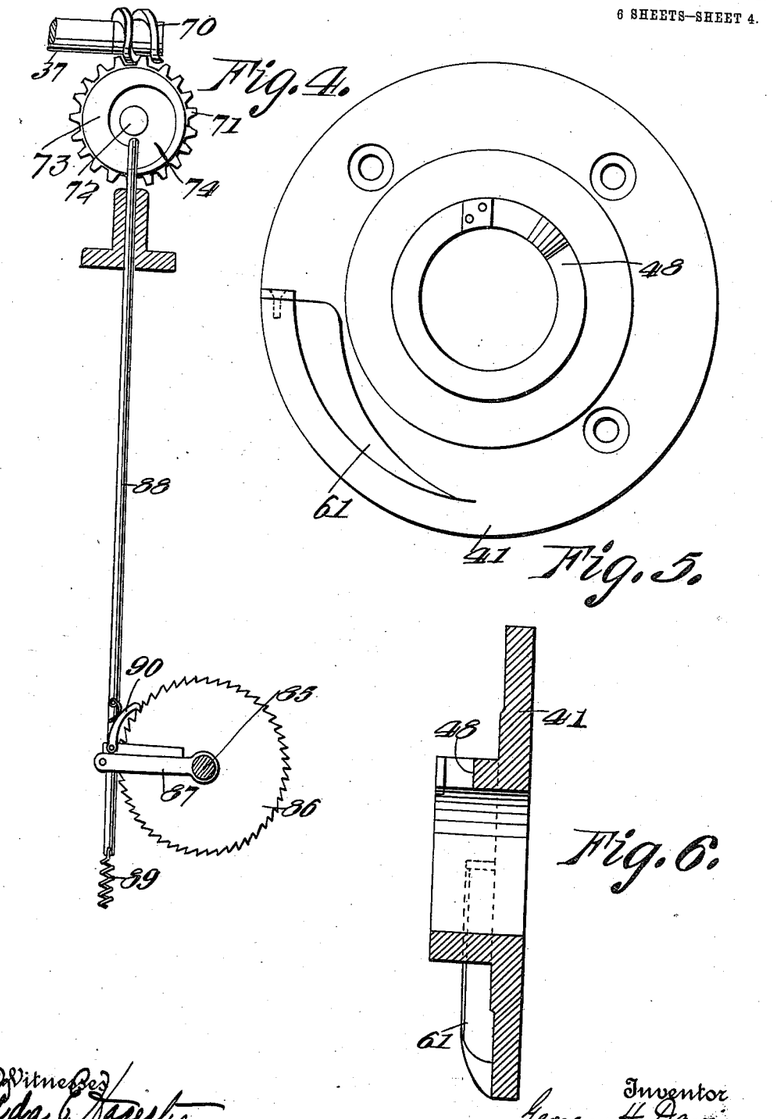
Fig. 4 is a detail view of the mechanism for operating the lace collecting rack.
Fig. 5 is a detail view of a fixed disk which is an element of the operating train.
Fig. 6 is a sectional view of said fixed disk.

The arm 34 is provided with braid tensioning means, braid gripping means and braid cutting means. Said arm and the gripping means conjointly constitute braid feeding means. The arm 34 moves with relation to a stationary disk, as 41, through which the shaft 37 passes, and also with relation to a stationary cam, as 42, which is secured fast upon the hub of the disk by a set screw; such fastening provides for the adjustment of the cam to desired positions upon the hub of the disk. The braid tensioning means consists of a pair of opposed wire jaws, as 43 and 44, the former including two parallel wires and the latter including a single wire which has a staggered relation to the wires of the jaw 43. The upper end portions of the jaws 43 and 44 extend in divergent relation in order that the braid may be efficiently guided into the space between the jaws. The jaw 44 is mounted on a projection 45 of the section 35 and the jaw 43 is mounted upon a block as 46, which is transversely slidable with respect to the projection 45, a portion of the block having a bearing upon a portion of the upper face of the projection. The block 46 is provided with a pin, as 47, which passes axially through the projection 45 and engages with its end in a cam surfaced groove 48, which is formed in the hub of the disk 41. Within the projection 45 a spring 47' is provided for maintaining the engagement of the pin 47 in the groove 48. When said pin has its innermost position in said groove, the jaws 43 and 44 will have such association as to tightly grip the braid passing therebetween but as the relative rotation of the arm 34 and the disk 41 continues, the cam surface of the groove will produce an outward movement of the pin 47 and therewith an outward movement of the block 46 and the jaw 43, so that the gripping engagement of the jaws with the braid is disestablished. At the commencement of the cycle of operations which the machine is designed to perform the braid is normally slack and the gripping engagement therewith of the jaws 43 and 44 is maintained only for such a fractional interval of the movement of the arm as is necessary to take up the slack. At the time when the tensioning means aforesaid has taken up the slack, the braid gripping means comes into action and as a necessary adjunct of the arm 34, produces the feeding of the braid.

Figure 14:
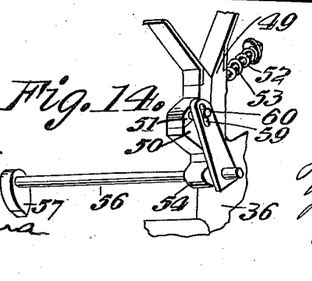
Fig. 14 is a detail view of the operative connections for the mechanism shown in Fig. 13.

The braid gripping means is mounted at the outer end of the section 36 and embodies a fixed jaw as 49 which is mounted on a projection 50 of said section 36, and a jaw, as 51, which is slidable toward and away from the jaw 49 and is held normally against the same by a spring, as 52, which surrounds a pin as 53 that is carried by the jaw 51 and extends through the jaw 49, the spring 52 having a bearing between the head of the pin and the jaw 49. The projection 50 is provided with a laterally projecting bearing as 54, and the section 35 is provided with an alining bearing as 55. A rock shaft as 56 is journaled in the bearings 54 and 55 and at its inner end is provided with a radial projection, as 57, and at its outer end with a radially projecting arm, as 58. The latter terminates in a slot as 59, and the jaw 51 is provided with a laterally extending pin, as 60, which projects through the slot 59 and constitutes the pivotal connection of the arm 58 and the jaw 51. The disk 41 is provided with an arcuate cam surfaced projection, as 61, which engages the projection 57, during the latter portion of the movement of the arm 34, and forces said projection outwardly against the tension of the spring 52. A rocking movement of the shaft 56 is thus produced and the spreading apart of the jaws 49 and 51 results. The lace is at this time released from the gripping device. The spread apart relation of the jaws 49 and 51 is maintained until the machine starts upon another cycle of operations at which time, shortly after the inception of the operative movement of the arm 34, the projection 57 is moved clear of the projection 61, and the spring 52 then becomes active to force the jaws 49 and 51 together and into gripping engagement with the braid.

The braid cutting means to which reference has been made, incidentally severs a tip and as a result of its operation two finished lace ends are produced. Such means preferably consist of a shearing mechanism, embodying a stationary knife, as 62, and a knife, as 63, which is slidable with relation to the stationary knife. The knives 62 and 63 may be advantageously mounted upon the underside of the section 36 and a slidable movement of the knife 63 is produced preferably by the following organization of mechanical elements. A bell crank lever, as 64, is pivoted to a lug on the section 36 and one leg of said lever is pivoted to the knife 63. The other leg of said lever is pivoted to a rod, as 65, which is axially slidable in bearings 66, provided on the sections 35 and 36. The end of the rod 65 is caused to bear at all times against the peripheral surface of the cam 42 by means of a spring as 67 which surrounds the rod 65, bearing against a projection thereon and the outer bearing 66. By reason of this organization of elements, when the end of the rod 65 is at the highest point of the cam 42, the knife 63 will have completed its cutting movement. As the rod recedes from this point, being held at all times by the spring 67 in relation to the cam 42, an opposite or resetting movement of the knife 63 is produced.

The arm 34 is provided at its inner end with a pair of radially projecting arms, as 68, which are disposed relatively to one another at an angle of about 90° and which are preferably made in axially adjustable sections in order that their length may be increased or decreased. The arms 68 terminate in forks, as 69, in which the braid is supported. The function of the arms 68 is to engage the projecting portion of the braid not acted upon at the termination of a cycle of operations consequent to a revolution of the arm and to initially position the braid prior to the inception of the next cycle of operations with relation to the instrumentalities which first come into action.

It will be seen that the instrumentalities so far described produce a finished shoe lace. The next instrumentality is the lace collecting mechanism. It has been seen that the laces are automatically released by the gripping mechanism after the cutting operation has been performed and the released laces are received and automatically divided into groups of a determined number, e. g., half a gross by the collecting mechanism. The shaft 37 is provided at its end with a worm wheel, as 70, which meshes with a worm wheel 71, on a short length longitudinal shaft, as 72. The latter is provided with a disk as 73 in one face of which a cam groove, as 74, is formed. To receive the finished laces a transversely disposed and transversely movable rack, as 75, is employed. This rack has a number of subdivisions, as 76, each of which receives a determined number of laces. The rack is advanced in a step-by-step manner and its subdivisions are continuously moved with relation to the operating arm 34. The rack is of inverted V-shape in cross section and straddles an endless operating chain, as 77. The chain 77 is trained over a pair of sprockets 78 and 79, the shafts of which are journaled in bearing standards 80. The standards 80 support longitudinal rails as 81 and the rack 75 is provided at each side thereof with rollers 82 which bear upon the rails 81, the latter thus constituting a supporting means for the rack. In order that the chain 77 may produce the necessary feeding movement of the rack, said chain is provided at desired intervals with projecting teeth, as 83, which engage projections as 84, that are provided at the apex of the rack.

The sprocket 78 is mounted upon a transverse shaft as 85, which has fast thereon a ratchet wheel as 86. Pivoted upon the shaft 85 is an arm, as 87, which is likewise pivoted to a link, as 88. The link 88 extends vertically and its upper end is operatively engaged in the cam groove 74 of the disk 73 while its lower end is connected to a retractile coil spring, as 89, one end of which is made fast. As the disk 73 revolves its groove 74 raises the link 88, thereby setting the spring pressed pawl 90 with which said link is provided in operative relation to the ratchet wheel 86. The raising of the link 88 is continued until such time as the shoulder of the cam groove has passed. The spring 89 then becomes active to exert a forcible downward pulling action on the link 88, and the latter, through the intermediary of its pawl 90 and the ratchet wheel 86, produces a movement of the shaft 85 and therewith of the sprocket wheel 78. The latter advances the chain 77 which in turn feeds the rack 75. These operations are performed in a step-by-step manner as is obvious.

To provide for the uniform and straight arrangement of the laces on the divisions 76 of the rack 75 the following mechanism is preferably employed. The arm 34 during the latter portion of its operative movement passes through a vertical shaft which embodies a pair of parallel walls, as 91, these being preferably of sheet metal. At the rear end of the rack 75, a transverse shaft as 92 is provided which is journaled in bearing standards 93 and which is provided with a sprocket wheel, as 94, and a disk as 95, in which a cam groove as 96 is formed. The shaft 92 is driven from the shaft 2 and accordingly the latter is provided with a sprocket wheel, as 97, over which and the wheel 94 a transmission chain as 98 is trained.

The innermost wall 91 is provided with a bearing as 99, for supporting and guiding an axially slidable rod 100. One end of the rod is operatively engaged in the cam groove 96 of the disk 95, and the other end of the rod is provided with a flat horizontal plate, as 101, which extends and moves through an opening in the adjacent wall 91, and is provided with a roller as 102 for coöperation with a clamping bed, as 103, which is arranged upon the opposite wall 91. The rod 100 is moved forwardly by a retractile coil spring as 104, one end of which is connected to the rod and one end of which is made fast. Just before the finished lace is released by the gripping mechanism on the arm 34 it is frictionally clamped between the roller 102 and the bed 103. This assures of the lace dropping evenly upon the rack and all the laces are thus uniformly positioned. The cam groove 96 causes the rod 100 to withdraw its roller 102 from the bed 103 but the operative relation of the roller and the bed is again established by the spring 104 as soon as the shoulder of the groove has passed the end of the rod.

It is assumed that the arm 34 is in a horizontal position, with its gripping jaws 49 and 51 adjacent the tipping plunger. The free portion of the line of braid is then resting loosely in the forks formed by the diverging portions of the jaws 49 and 51 and 43 and 44. The latter pair of jaws first come into action in the manner explained and grip the free portion of the braid near its end for a sufficient period of the movement of the arm to take up the slack of the braid. At this time the jaws 49 and 51 come into action in the manner explained and grip the braid near the newly applied tip and the jaws 43 and 44 then release their end of the braid. The revolving movement of the arm 34 coupled with the gripping action of the jaws 49 and 51 produces a feeding of the braid which is maintained until the arm 34 is at a position of more than 180° from its initial position. At such time the free portion of the lace pendant from arm 34, hangs adjacent the clamping bed 103 and in the path of the advancing roller 102. At this time two operations take place, in close succession, the one involving the severing of the braid and of the tip and the other involving the clamping of the pendant free portion of the braid by the parts 102 and 103. As the arm continues its travel the severed portion of the lace is brought over the rack 75 and is then released by the jaws 49 and 51, in the manner explained. The arms 68 move with relation to the remaining free portion of the braid just fed by the arm 34 and from which the lace has been severed and position said remaining free portion with relation to the instrumentalities which first come into action, viz., the tensioning gripping jaws, and the feeding gripping jaws. During the last portion of the movement of the arm, more exactly during that portion of the movement of the arm which involves simply a restoration of the parts to their initial positions, and after the instrumentalities mentioned have completed their respective operations, the tipping mechanism is operated and a tip is applied to the free portion of the braid. After this operation, the steps detailed above are repeated and so on *ad infinitum*.

To enable the lengthening and shortening of the lace the sections 35 and 36 of the arm 34 are adjustably connected, in order that the arm may have its length increased or decreased, and the cam 42 is adjustably mounted on the hub of the wheel 41, in order that the timing of the cutting action may be regulated to determine the length of the lace. The arms 68 are likewise made in sections connected for axial adjustment for the same purpose.

Having thus described my invention, I claim as new and desire to secure by Letters Patent;—

1. In a machine of the type set forth, the combination of a revolving braid carrying arm, braid tensioning means connected to the inner end of said arm, and braid gripping means connected to the outer end of said arm and arranged to operate subsequently to the first-named means.

2. In a machine of the type set forth, the combination of a revolving braid carrying arm, braid tensioning means connected to the inner end of said arm, and separate braid gripping and braid cutting means connected to the outer end of said arm and arranged to operate subsequently to said tensioning means.

3. In a machine of the type set forth, the combination of a revolving braid carrying member, braid tensioning means connected to the inner end of said member, separate braid gripping and cutting means connected to the outer end of said member and arranged for successive operation subsequent to the operation of said tensioning means, and supporting means likewise connected to the inner end of said member for carrying the free projecting portion of the braid into position with relation to said tensioning means during the movement of said member to initial position, said supporting means being arranged to operate subsequently to said cutting means.

4. In a machine of the class set forth, a revolving arm comprising inner and outer sections, braid tensioning means carried by the inner section of said arm, and separate braid gripping and braid cutting means carried by the outer section.

5. In a machine of the class set forth, a revolving arm comprising inner and outer sections, braid tensioning means carried by the inner section of said arm, separate braid gripping and severing means carried by the outer section, and braid supporting means carried by said inner section for carrying the free projecting portion of the braid into position with relation to said tensioning means during the movement of said arm to initial position.

6. In a machine of the type set forth, a revolving braid-carrying member comprising inner and outer sections adjustably connected together, braid tensioning means carried by the inner section of said member, and braid gripping and braid cutting means carried by the outer section.

7. In a machine of the type set forth, a revolving braid carrying member comprising inner and outer sections arranged in axial alinement and connected together for axial adjustment to vary the length of the laces produced, and braid cutting means carried by the outer section.

8. In a machine of the type set forth, a revolving braid-carrying arm, braid cutting means mounted thereon comprising fixed and movable knives, and means for operating the movable knife including an endwise movable rod connected with the same and arranged longitudinally of said arm and a cam for producing the movements of said rod.

9. In a machine of the type set forth, a revolving braid carrying arm comprising inner and outer sections adjustably connected together, braid tensioning means carried by the inner section of said arm, and braid gripping means carried by the outer section.

10. In a machine of the type set forth, a revolving braid-carrying member, braid-cutting means mounted on said member and comprising fixed and movable knives, a bell crank lever pivoted to said member and having one arm thereof pivoted to the movable knife, an endwise movable rod carried by said member and pivoted at one end to the other arm of said lever, and a cam engaging the opposite end of said rod.

11. In a machine of the type set forth, a revolving braid-carrying arm comprising alining inner and outer sections connected together for axial adjustment, the last-named section being provided with fixed and movable knives, a bell crank lever pivoted to said section and having one arm thereof pivoted to the movable knife, an endwise movable rod pivoted at one end to the other arm of said lever, and a cam engaging the opposite end of said rod.

12. In a machine of the type set forth, a revolving braid-carrying arm, braid-gripping means carried by said arm and comprising fixed and movable jaws, a rock shaft mounted on said arm and operatively connected with the movable jaw, means for actuating said shaft, and separate braid-cutting means mounted on said arm.

13. In a machine of the type set forth, a revolving braid carrying member comprising adjustably connected inner and outer sections, braid cutting means carried by the outer section, a stationary cam adjustable pivotally about its axial center, and an operative connection between said cam and said braid cutting means.

14. In a machine of the type set forth, a revolving braid feeding arm, braid gripping means on the arm, braid cutting means on the arm, and radially projecting forks on the arm for positioning the free projecting portion of the braid with relation to the braid gripping means, at the inception of the operative movement of the arm.

15. In a machine of the type set forth, a revolving arm made in sections, connected together for axial adjustment to vary the length of the laces produced, and braid cutting means on the outer section.

16. In a machine of the type set forth, a revolving arm made in sections connected together for axial adjustment, braid cutting means on the outer section, a stationary cam adjustable pivotally about its axial center and an operative connection between the cam and the braid cutting means.

17. In a machine of the type set forth, the combination, with a revoluble braid carrying arm, and lace gripping means carried by the same, of a lace collecting rack located beneath said arm, means for causing said gripping means to deposit the lace originally held thereby directly upon said rack, when said arm is in a position wherein it overhangs said rack, and a lace clamping device for holding the lace with relation to said rack just prior to its release by said gripping means, said clamping device comprising a reciprocatory rod, means for operating the same, a clamping member carried by said rod, and a clamping bed with which said member is designed to coöperate.

18. In a machine of the class specified, the combination of a revolving arm provided at its outer end with a fixed jaw and a spring controlled movable jaw, a rock shaft carried by said arm and provided with a finger, a cam engaging said finger to operate said shaft, and a radial arm secured to said shaft and pivotally connected to movable jaw.

19. In a machine of the class specified, the combination of a revolving arm provided at its outer end with a fixed knife and a movable knife, an axially slidable rod carried by said arm, a bell crank lever pivoted to said arm and connected with one end of said rod and with said movable knife for operating the latter, a cam engaging the other end of said rod for actuating the same, and means for holding the second-named end of said rod against said cam.

20. In a machine of the class specified, the combination of a revolving arm provided adjacent its axis of revolution with a projection, a block slidable thereon and provided with a wire jaw, a wire jaw attached to said projection for coöperation with the first-named jaw, a pin fastened to said block and extending through said projection, and a cam engaging the projecting end of said pin for effecting the sliding movement of said block during the revolution of said arm.

21. In a machine of the class specified, a revolving arm made in sections connected together for axial adjustment, and braid gripping and braid cutting means carried by the outer section of said arm.

22. In a machine of the class specified, a revolving arm provided at its outer end with a fixed gripping jaw and a spring controlled movable jaw, a rock shaft carried by said arm and provided at one end with a finger and at the other end with a radial arm having a slot formed therein, a pin provided upon said movable arm and engaged in said slot, and a cam engaging said finger to operate said shaft.

23. In a machine of the class specified, the combination, with lace gripping means, of a lace collecting rack upon which said gripping means is adapted to deliver the laces, and a lace clamping device for holding the lace with relation to said rack just prior to its release by said gripping means, said clamping device comprising a reciprocatory rod, means for operating the same, a clamping member carried by said rod, and a clamping bed with which said member is designed to coöperate.

In testimony whereof I have signed my name to this specification in the presence of two subscribing witnesses.

GEORGE H. DAVIS.

Witnesses:
 ADA E. HAGERTY.
 J. S. MILLER.

Copies of this patent may be obtained for five cents each, by addressing the "Commissioner of Patents, Washington, D. C."